United States Patent [19]
Fryszer et al.

[11] Patent Number: 5,458,957
[45] Date of Patent: Oct. 17, 1995

[54] LIGHT REFLECTING SCREEN

[75] Inventors: Emanuel Fryszer; Yoav Gutman, both of Kibbutz Nir Itzhak-Sufa, Israel

[73] Assignee: Polysack Plastic Industries Nir Itzhak-Sufa, Kibbutz Nir Itzhak-Sufa, Israel

[21] Appl. No.: 312,570

[22] Filed: Sep. 26, 1994

[51] Int. Cl.$^6$ .................... D06C 11/00; B32B 15/08
[52] U.S. Cl. .................... 428/242; 428/246; 428/258; 428/265; 428/373; 428/374; 66/169 R
[58] Field of Search .................... 26/28.1, 31; 428/242, 428/246, 288, 265, 373, 374

Primary Examiner—Patrick J. Ryan
Assistant Examiner—Richard P. Weisberger
Attorney, Agent, or Firm—Browdy and Neimark

[57] ABSTRACT

A net is provided having a plurality of threads oriented in one direction and being essentially equal spaced from one another, and having wefts oriented in a second direction which is perpendicular to said one direction, the threads forming stitches which hold the weft in position in the net. The wefts in the net are bands made of a laminate having a first layer consisting of a transparent, mono-oriented polymeric film having an axis, being defined by a direction in which the film has been stretched to achieve mono-orientation, which is in the direction of the band's longitudinal axis, a second layer on said first layer consisting essentially of aluminum, and a third layer on said second layer consisting of transparent material capable of protecting said second layer from degredation.

6 Claims, 1 Drawing Sheet

LIGHT REFLECTING SCREEN

FIELD AND BACKGROUND OF THE INVENTION

The present invention concerns nets intended to be used as thermal screens and having light reflecting properties. Such screens will be referred to herein as "light reflecting screens".

Light reflecting screens are routinely used for various purposes, the most common one being in partial shading of areas. For example, in greenhouses it is at times desired to allow only part of the solar radiation to penetrate the greenhouse in order to avoid access solar radiation which may damage the plants. It is a common practice to use light reflecting screens therefor which allow only partial penetration of the solar light. However, such screens can absorb also some of the solar light and emit heat and in order to reduce this heating effect, such screens, which were typically woven nets, were partially supplemented with light reflecting bands, usually made of aluminum foil. However, in view of the very low tensile resistance of aluminum foils, such fibers can constitute only a small portion of the material in the screens.

A screen which is resistant to tears on the one hand and has very good light reflecting properties on the other hand is very much desired and it is the object of the present invention to provide same.

SUMMARY OF THE INVENTION

The present invention provides a net having a plurality of threads oriented in one direction and being essentially equal spaced from one another, and having wefts oriented in a second direction which is perpendicular to said one direction, the threads forming stitches which hold the weft in position in the net;

the wefts consisting of bands made of a flexible laminate having a first layer consisting of a transparent, mono-oriented polymeric film having an axis, as herein defined, which is in the direction of the band's longitudinal axis, a second layer on said first layer consisting essentially of aluminum, and a third layer on said second layer consisting of transparent material capable of protecting said second layer from degradation.

In accordance with the present invention a net is formed having wefts consisting of bands made from a flexible laminate, i.e. from a flexible multi-layer polymer-based film. It is the use of such laminates which allows the formation that light reflecting screens in the form of nets, which have very good light reflecting properties on the one hand and high tensile strength on the other hand. Furthermore, the high tensile strength of the bands is also important in view of the fact that during the knitting process, the bands have to withstand high shearing forces.

Mono-orientation of a film is obtained by stretching a film in one direction. The direction on which the film has been stretched to achieve the mono-orientation, will be referred to herein as "axis". A mono-oriented film is generally of high tensile strength, is resistant to tears in a direction perpendicular to the axis, but has a low resistance to tears in a direction parallel thereto. This fact allows to easily form bands from a mono-oriented film by cutting the film in a direction parallel to the axis. The bands which are formed are resistant to transverse tearing and additionally have relatively high tensile strength.

The net is formed from the strings and bands in a manner generally known per se. By one embodiment, the wefts in the net extend from one end to the other. By another embodiment, the wefts between two adjacent strings are formed by a single continuous band which zigzags back and forth between and along two adjacent strings.

The invention will now be described in somewhat more details in the following description of some non-limiting embodiments.

DESCRIPTION OF SPECIFIC EMBODIMENTS

Figure 1:
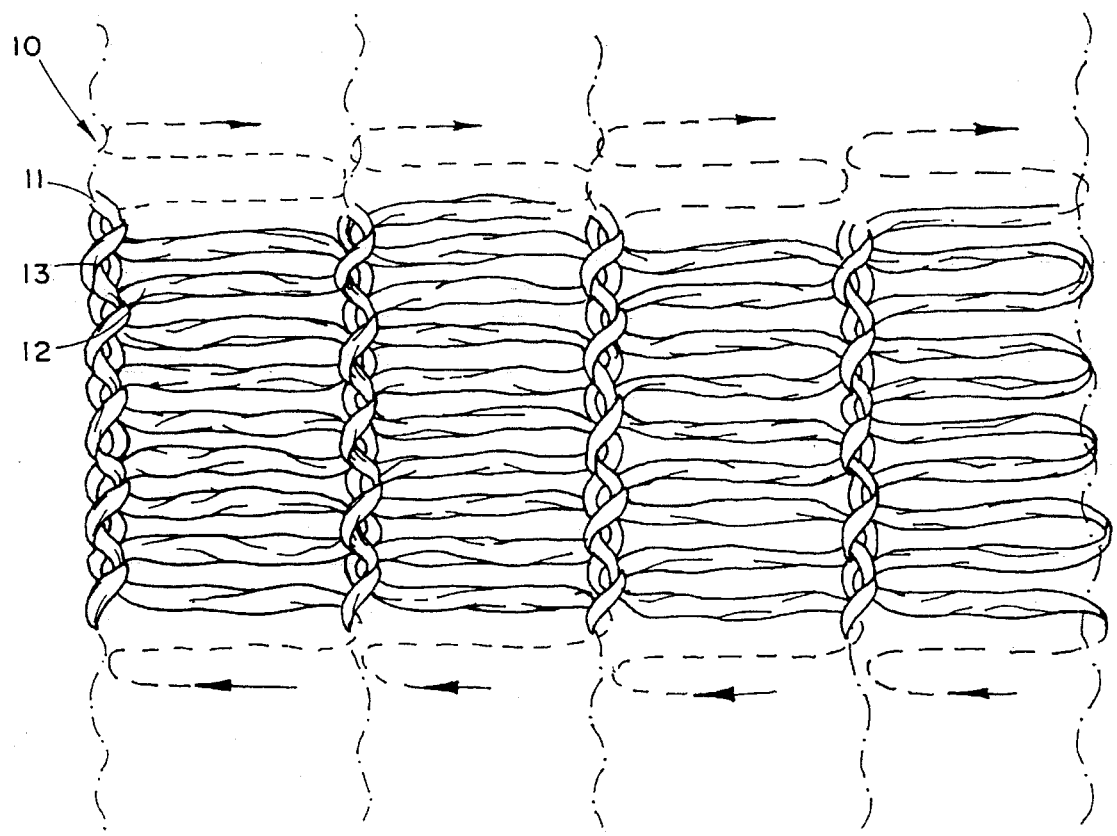
FIG. 1 shows a portion of the net in accordance with one embodiment of the invention.

Reference is first being made to FIG. 1 showing a portion of a net 10 in accordance with the present invention. The net consists of strings 11 and wefts 12, the wefts being essentially perpendicular to the strings. The strings 11 form stitches 13 holding the wefts in position in the net. The wefts 12 consist of continuous bands which zigzag between and along two adjacent strings of the net. Nets having this structure have good tensile strengths in all directions.

Figure 3:
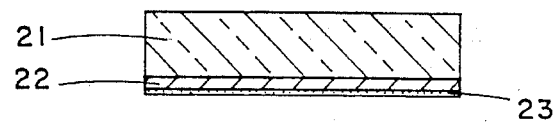
FIG. 3 is a schematical cross-sectional view through lines 3—3 in FIG. 2.
Figure 2:
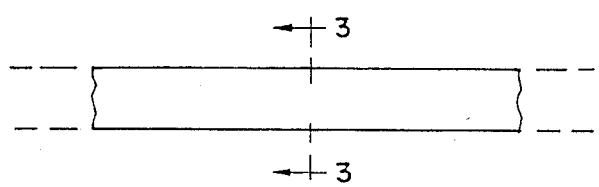
FIG. 2 shows a portion of a band forming the wefts.

The wefts as shown schematically in FIGS. 2 and 3, are bands made of a flexible laminate having a first layer 21, consisting of a mono-oriented transparent film, a second layer 22 consisting essentially of aluminum and a third layer 23 made of a transparent material which protects the second layer from degradation.

The axis of orientation of the mono-oriented film is in the direction of the longitudinal axis of the bands forming the wefts. Mono-oriented polymeric films may be prepared from polymers such as polyolefins, polyesters, polyamides, polyimides and other polymeric film making substances and mixtures of different polymers. Examples of polymers are linear low density polyethylene (LLDPE), high density polyethylene (HDPE), polypropylene or a combination thereof. At times it may be advisable to supplement the polymers with various additives such as UV stabilizers and processing agents.

A mono-oriented polymeric film is prepared by stretching a prepared polymeric film in only one direction. The stretching of a polymeric film may for example be by a factor of about 5 to 9, with a stretching factor of about 7–8 being preferred. (The stretching factor is the ratio between the length of a unit film after stretching to its length prior to stretching).

A mono-oriented polymeric film is prepared by a continuous extrusion process. This may be performed on a single machine, consisting of a feeding unit, an extruder equipped with a round die and a temperature control unit, an air cooling ring for cooling the material exiting from the die and a stretching unit which comprises oil heated rollers equipped with a system controlling both the heating and the turning speed of said rollers. The machine preferably includes also a high voltage discharge treatment unit (the discharge treatment is an electric surface treatment intended to prepare the film for lamination).

A particular example of a mono-oriented film suitable for use in nets in accordance with the present invention is one made of HDPE. For its preparation, pellets or granules of HDPE and preferably in a mixture with some additives such as silicon-based UV-stabilizers and processing agents (e.g. HALS 622™), known per se (0.2 and 2% relative to the amount of HDPE, respectively) are introduced to an extruder through its feeding system. The pellets or granules are then molded and compressed by a screw inside the extrusion cylinder which is maintained at a temperature of 175° C.–200° C. The molten HDPE exits through the extruder nozzle emerging as a tube which is cooled and expanded by air through an air ring, forming a polyethylene balloon having a wall the thickness of about 0.2 mm. The polyethylene balloon is slit on a slitting table to form an open polymeric film which is then rolled on a roller system.

This polymeric film passes then through a stretching system. The stretching system comprises several heating rollers, the first one of which is suitably heated to about 100° C., and the last one to about 125° C., and a stretching roller which stretches the film emerging from the 125° C. heating roller. The ratio of roller velocities (stretching rollers or heating rollers) is adjusted so as to achieve a stretching factor of about 8. In this process the thickness of the polyethylene film is reduced from about 150–200 μm to about 25–30 μm. After the stretching the film is passed over an annealing roller and then over a cooling roller which cools the film to room temperature. After the stretching process is completed, the polymeric film is passed through the high voltage discharge treatment unit to prepare it for lamination and/or for printing.

The obtained mono-oriented polyethylene film has typically a density of about 0.945 gr/cm$^3$ and a tensile strength of about 320 MPa.

The aluminum layer is suitably formed on the first layer by vapor deposition in a vacuum. The vapor deposition apparatus consists of a vacuum chamber in which the pressure is reduced to about 3.5 mm Hg and to which vaporized aluminum is introduced. In the vacuum chamber the film passes through rollers and over a cooling drum having typically a temperature of 20°–25° C. The cooling of the film by the cooling drum causes the aluminum vapor to deposit on the exposed film surface. In order to allow for effective deposition of aluminum, the film passes through the vacuum chamber at a rate so that each portion stays in the chamber for about 15–30 seconds. The aluminum layer has typically a thickness of about 0.3 μm.

The third layer may be another polymeric film layer, e.g. made of polyethylene, or may be a lacquer layer. Polyethylene coating may be applied by a flat dye coating extrusion process, and the coated film being suitably LDPE film having a thickness of about 9–12 μm. A lacquer layer may suitably be prepared from a solution comprising 75% water soluble resins (for example NEOREZ R961, manufactured by Imperia Chemical Industries, U.K.), 15–20% water, 4–10% ethanol and 1–5% curing agents. The lacquer coating is suitably of a thickness of about 3 μm.

In order to prepare the net, the multi-layer film is cut to long filaments having a width from about 1.8 to about 2.5 mm. The nets cam be prepared by a Raschel knitting method known "per se" in which the filaments are attached to knitting elements which comprise two needles and knock-over comb bars which are positioned opposite to one another, and comprising ground guide bars, pattern guide bars and stitch comb bars.

The knitting density may be about 3–6 loops per cm$^2$.

We claim:

1. A net having a plurality of threads oriented in one direction and being essentially equal spaced from one another, and having wefts oriented in a second direction which is perpendicular to said one direction, the threads forming stitches which hold the weft in position in the net;

the wefts being panels made of a laminate having a first layer consisting of a transparent, mono-oriented polymeric film having an axis, being defined by a direction in which the film has been stretched to achieve mono-orientation, which is in the direction of the band's longitudinal axis, a second layer on said first layer consisting essentially of aluminum, and a third layer on said second layer consisting of transparent material capable of protecting said second layer from degradation.

2. A net according to claim 1, in which the wefts between two adjacent strings are formed by a single continuous band which zigzag back and forth between anti along the two adjacent strings.

3. A net according to claim 1, in which the first layer is made of a mono-oriented high density polyethylene.

4. A net according to claim 1, in which the second layer is a vapor deposited aluminum layer.

5. A net according to claim 1, in which the third layer is a lacquer layer.

6. A net according to claim 1, in which the third layer is an LDPE layer.

* * * * *